United States Patent [19]
Besing

[11] Patent Number: 5,274,951
[45] Date of Patent: Jan. 4, 1994

[54] "GRASS WAFFLE" OR "SEED WAFFLE"

[76] Inventor: David J. Besing, 1800 S. Penn. Apt. #1, Roswell, N. Mex. 88201

[21] Appl. No.: 872,932

[22] Filed: Jun. 15, 1992

[51] Int. Cl.$^5$ .............................................. A01C 1/04
[52] U.S. Cl. ............................................ 47/56; 47/9; 47/58; 111/900; 111/901
[58] Field of Search ................ 47/56, 95, 58, 58.25; 111/900, 901, 5

[56] References Cited

U.S. PATENT DOCUMENTS

| | | | |
|---|---|---|---|
| 526,512 | 9/1894 | Perschl | 47/56 |
| 2,309,702 | 2/1943 | Kirschenbaum | 47/56 |
| 3,112,577 | 12/1963 | Barger | 47/56 |
| 3,139,701 | 7/1964 | Nishiachi | 47/56 |
| 3,160,986 | 12/1964 | Watson | 47/56 |
| 3,257,754 | 6/1966 | Ohsol | 47/56 |
| 3,704,544 | 12/1972 | Spanel | 47/56 |

FOREIGN PATENT DOCUMENTS

| | | | |
|---|---|---|---|
| 79357 | 1/1976 | Japan | 47/56 |
| 153719 | 8/1985 | Japan | 47/56 |

Primary Examiner—Henry E. Raduazo

[57] ABSTRACT

A seed delivery device comprises a flat, flexible seed of bio-degradable material, a plurality of apertures formed through said sheet to present a waffle-like configuration to allow passage of water and sun therethrough, and a plurality of seeds bonded to one side of said sheet between said apertures, wherein said sheet may be positioned adjacent the earth to cause growth of the seed through the sheet. The seed delivery device is formed of paper-maché, wherein said apertures are rectangular, symmetrically positioned relative to one another, and tapered. The seed delivery device also comprises nutrients impregnated into said sheet.

5 Claims, 2 Drawing Sheets ns
"GRASS WAFFLE" OR "SEED WAFFLE"

TECHNICAL FIELD OF THE INVENTION

This invention relates to a seed delivery device, and more particularly to a grid which bears seeds and which may be easily planted.

BACKGROUND OF THE INVENTION

Numerous methods have been used historically to convey and protect seed. Presently grass seed is blown, sewn or drilled on verges and grades on flat areas with a covering of straw to protect the same. Usually, both wind and water move the straw and seed and erode the area requiring further dirt-work and/or replanting; even the water applied for germination does some damage. This method is labor and time consuming with very mixed successes. "Sod-grass" (a layer of soil medium with growing grass) is undercut into strips for planting or placed in small portions or "plugs" to fill in, in the future, by the natural spreading of some grasses. These methods are excessively expensive and have a very limited replanting or shelf life. They require rolling to try to mate the sod with the soil and endeavor to remove air from root area. The labor and water necessary are excessive. "Sod" and/or "plugs" both can also deliver plant diseases and unwanted parasites to new locations. Old protective tents of silk, paper, plastic and glass also mostly require installation and removal at great labor and expense after seedings are established, and can cause scorch by entrapping heat.

SUMMARY OF THE INVENTION

It is an object of the invention to furnish a simple and easy way to convey, plant, protect and feed various seeds, throughout the establishment of plants. This method does not require removal of some types of "tents" or "covers" after seed germinates. It will be particularly useful and labor-saving in large areas as natural cooling by evaporation takes place. This product will, in many applications, be placed on raw construction soil with little or no fertile topsoil or nutrients to maintain root penetration and growth, therefore, the product acts as food as well as "retains the seed in place" (as distinguished from the prior art methods). These waffles are light, easily transported, labor-saving, and have a long shelf life (the same as package seeds). It is a further object to utilize waste paper and fiber (that is presently chocking landfills). Use of the present invention could result in significant reduction of waste material.

BRIEF DESCRIPTION OF THE DRAWINGS

The present invention will be more fully understood by reference to the following detailed description thereof when read in conjunction with the attached drawings, and wherein, the drawings are typical segments of the whole waffle pattern which is preferably 24 inches wide by continuing length, cut into various lengths after manufacture.

DETAILED DESCRIPTION OF THE INVENTION

The preferred embodiment of the present invention and its advantages are best understood by referring to FIGS. 1-5 of the drawings, like numerals being used for like and corresponding parts of the various drawings.

The present invention is multi-functional, comprising a paper-maché grid or "Waffle". This shape was chosen due to its ability to adhere to the soil after wetting and resist movement by natural forces of wind and water, preventing most soil and seed erosion. The seeds are attached to the back or "down-side", thereby imbedded into the soil on installation (planting) to the "recommended depth and amount" for best coverage of the area. It further discourages birds from feeding on the seed. Fertilizer and vitamins are incorporated in the paper-maché and leach release with application of moisture, to furnish the incubation seed with the optimum growth environment in poor soil. The waffle is then, in time, incorporated into the soil as mulch, by insects and bacterial means, becoming topsoil. The waffles are sterilized by high-heat in drying, and are biodegradable.

Figure 1:
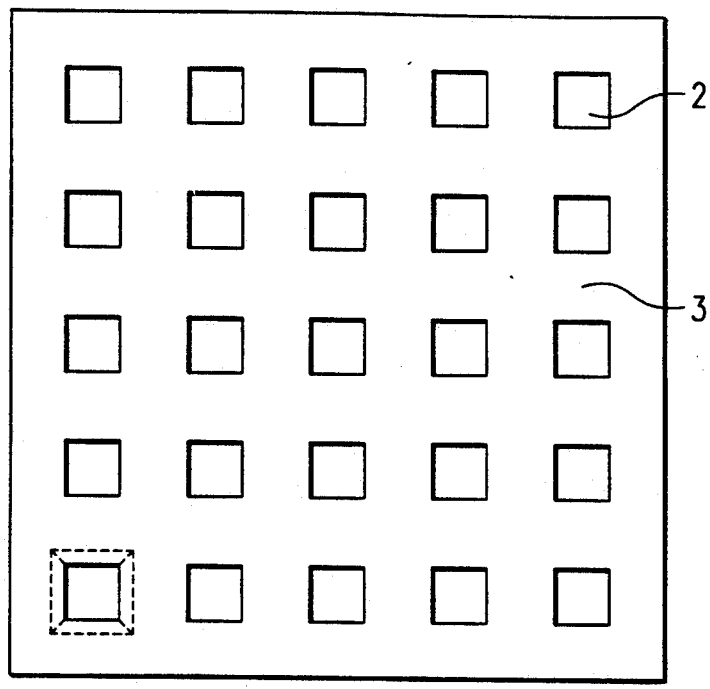
FIG. 1 is the top view of the product segment.

The partial segment of the compound product as depicted in FIG. 1, shows a rectangular paper-maché sheet with a plurality of rectangular apertures or cutouts 2 formed therein, where light and moisture for germination cause the seed to grow through the product. The top surface of the sheet allows excessive water to saturate and run off on webs 3 blocking approximately half the saturation and/or evaporation except through the apertures 2. The sheet may be impregnated with fertilizers and colored green. The amount of fertilizer and vitamins have to be adjusted to the requirements of the soil, seed and geographical rainfall amounts, in the consumer's area, as some states have several climatic requirements for different seeds, both for soil retention and lawns or crops, the fertilizer may vary depending on the nutrient requirements of the seeds Vitamin B-1Thiamine Hydrochloride may be added as to furnish the incubating seeds with the optimum growth environment in poor soil.

Figure 2:
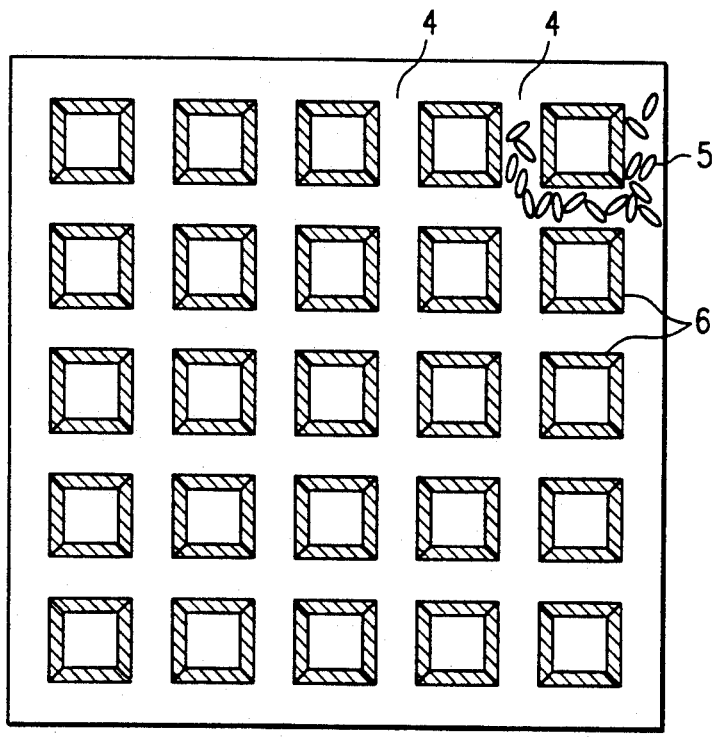
FIG. 2 is the bottom view of the product segment.

FIG. 2 shows the bottom of the grid that is coated with adhesive 4 which bonds seed 5 applied adjacent to the apertures 2. FIG. 2 also depicts the taper 6 of the apertures 2 to ease mold release and lessen resistance to soil penetration of the entire seed web.

When planting (FIG. 3), 7 is the minimum planting depth recommended in soil, and 8 is the maximum soil depth recommended.

Figure 4:
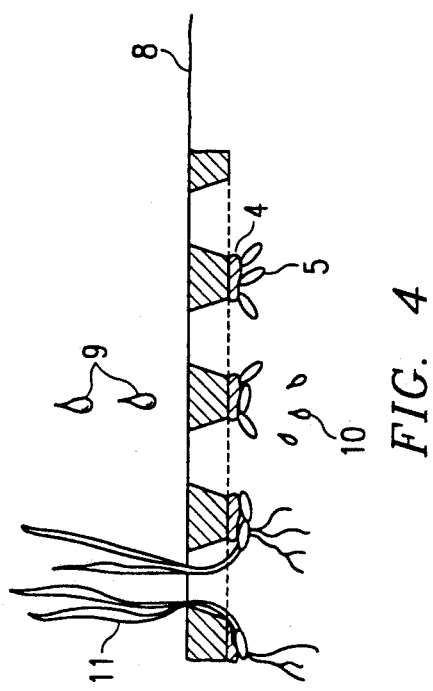
FIG. 4 is a cross-section.

FIG. 4 illustrates moisture 9 that falls on the product, thus releasing nutrients 10 into root area with seedlings and roots illustrated in 11.

Figure 5:
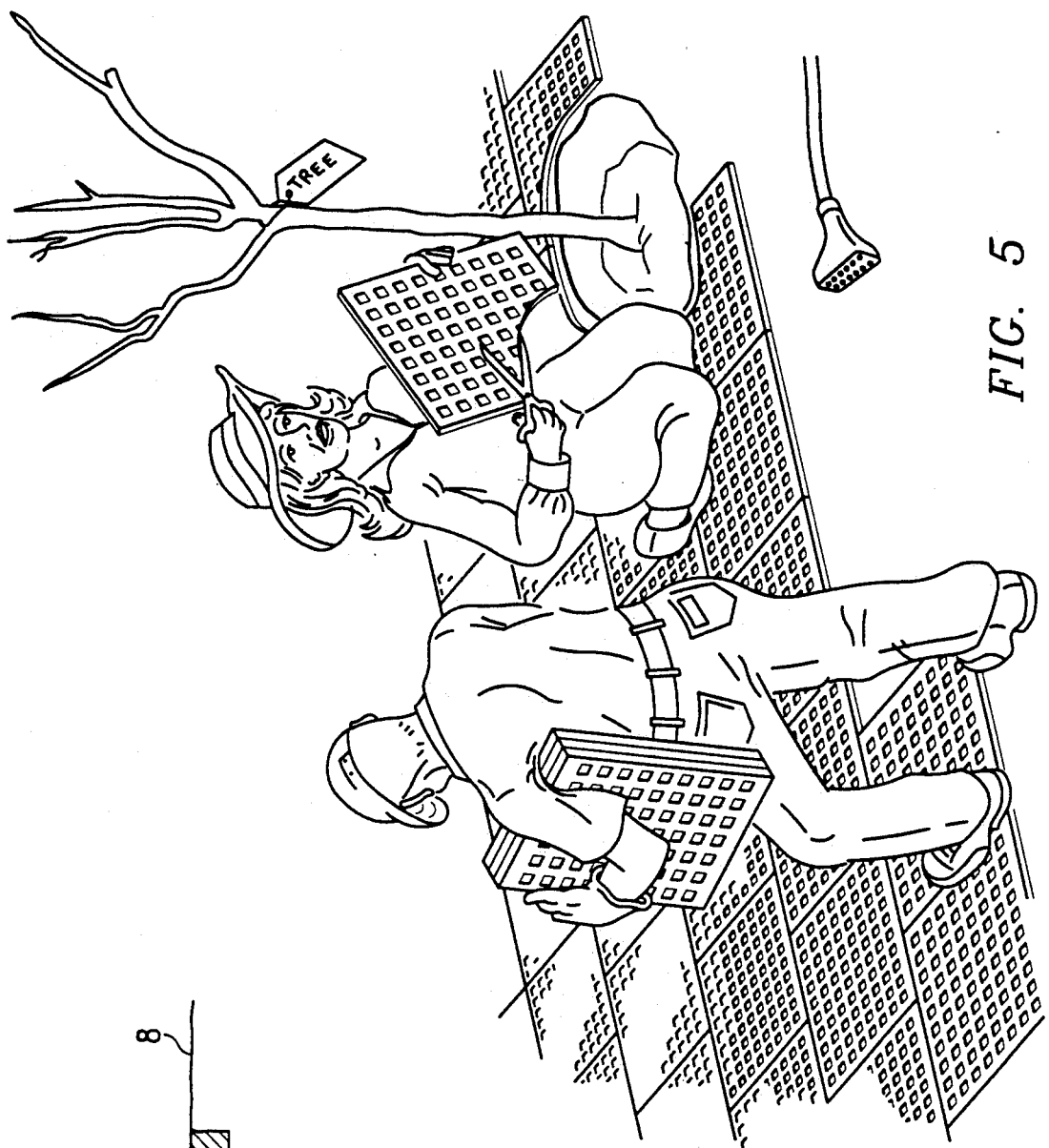
FIG. 5 is a sketch of the product in use.

FIG. 5 illustrates how the sheets are cut and planted.

Figure 3:
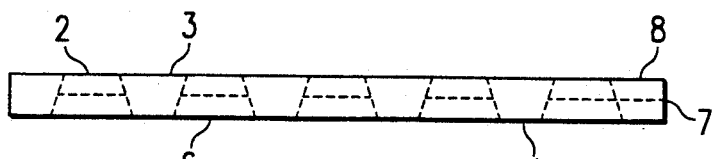
FIG. 3 is a side view.

Illustrations are accurate for most grass seed applications. Other grasses and crops, however, will require modifications such as smaller or larger apertures and adjustment to the thickness as shown in FIGS. 2 and 3 in order to place seed 5 at "proper planting depth."

The product is manufactured from paper-maché as follows:

1. The paper is shredded and mulched in a mixer with water, fertilizer and vitamins with green food color added.
2. The mixture is then rolled into conveyor belt molding forms and excess water extracted by pressure and vacuum.
3. Dried in ovens on conveyor.

4. Perforated with 3/8 holes.
5. Glue made of corn starch is rolled on the bottom side (see FIG. 2), and seed distributed, dried again and bundled.

In summary, in the manufacture of this compound product, the paper is minutely shredded by machine, conveyed to a mixing machine where paper, a small two percent cornstarch as a binder, food color (for aesthetic purposes), fertilizer and vitamin B-1 are mulched or mixed with water to a mortar or thickened batterlike consistency, the mulch is then fed into a pressure hopper and extruded onto a molding conveyor where excessive water is removed by pressure/molding wheels and wet vacuuming. Having obtained its waffle shape, it is further dried by convection oven, cut, perforated and stored. In the next process, a non-toxic adhesive is rolled onto the down-side and the "required" seed distributed into the adhesive. It is then re-dried, packaged and shipped to the consumer.

Through heat absorption and moisture retention, the present invention offers an enhanced seed-germination vehicle. Significant technical advantages of the invention include:

1. Minimizing disposal and loss of seed by wind and most excessive rain squalls (samples worked well on 80% grade).
2. Preventing birds from feeding on seeds.
3. Adhering to soil, ultimately becoming mulch.
4. Limiting absorption to perforation area and conducting excessive water to drainage.
5. Utilizing recycled paper, but not limited to such products.
6. Aiding growth on sterile soil by slowly leaking food into root area of seed because maché is mixed with organic or chemical fertilizers.
7. Blocking some evaporation other than through apertures, thereby retaining moisture at seed level.
8. By seed placement on the grid, placing the seed at the required planting depth at recommended amounts for full-coverage with surplus.
9. The entire product is bio-degradable and natural.
   A. Paper-maché molded matt of truncated pyramidal shapes, perforated.
   B. Organic fertilizer from three to five percent may be added.
   C. Green food color may be added.
   D. Glue to hold seed may be thickened corn starch.

As shown in FIG. 5, the user places the seed-side down on loose soil, presses in place, then waters. The seed germinates in protected area underneath the waffle and seeks sun through apertures.

The segments preferably measure 4×4 inches; however, the product will be produced in large sheets with a possibility of rolls for highway usage.

While there is shown and described a present preferred embodiment of the invention, it is to be distinctly understood that the invention is not limited thereto, but may be otherwise variously embodied and practiced within the scope of the following claims.

I claim:

1. A product for delivery and incubation of seeds comprising a sheet of bio-degradable material having an upper surface, a lower surface, a substantial thickness and a plurality of closely spaced openings extending through said substantial thickness from said upper to lower surface, said sheet being provided with a plurality of seeds on said lower surface whereby when said product is placed with said lower surface contacting the ground, the seeds will germinate and grow through said closely spaced openings.

2. The product of claim 1, wherein said bio-degradable material is paper-maché.

3. The product of claim 1, wherein said sheet and apertures are in the form of a waffle pattern having intersecting ribs of substantial thickness and polygonal openings defined between said ribs.

4. A method of growing grass comprising the steps of providing a sheet of bio-degradable material having an upper surface, a lower surface, a substantial thickness and a plurality of closely spaced opening extending through said substantial thickness from said upper to said lower surface, providing seeds on said lower surface, placing said lower surface in contact with the earth and permitting plants to grow up through said openings, bonding said sheet to the earth.

5. The method of claim 4, wherein the step of providing a sheet of bio-degradable material comprises pressing said sheet from paper-maché.

* * * * *